Patented Apr. 22, 1930

1,755,752

UNITED STATES PATENT OFFICE

FRITZ ULFFERS, OF BERLIN-CHARLOTTENBURG, GERMANY, ASSIGNOR TO SCHERING-KAHLBAUM AKTIENGESELLSCHAFT, OF BERLIN, GERMANY

PROCESS OF MANUFACTURING ESTERS OF THE BORNEOLS

No Drawing. Application filed March 30, 1926, Serial No. 98,626, and in Germany April 11, 1925.

My invention relates to a process of manufacturing esters of the borneols (isoborneol and borneol) from camphene without the intervention of a catalyst.

As a rule organic acids such as for example acetic acid react so inertly and incompletely with camphene that to obtain esters of isoborneol and borneol commercially the cooperation of an active catalyst is necessary. Usually the catalyst employed is sulphuric acid.

It may be noted, however, that a process of no commercial value on account of the poor yield obtained is known in which formic acid is caused to react with camphene without the use of catalytic acids (Berichte der Deutschen Chemischen Gesellschaft, vol. 21. 1888 referate pages 605 and 606).

I have discovered the reaction between camphene and fatty acids depends upon conditions of heat and/or the quantity of fatty acid present in the reaction and that if either of these factors is suitable the reaction takes place both quickly and completely.

According to one feature of this invention therefore the reaction between camphene and a fatty acid is effected without the use of a catalyst at a temperature raised above the usual grade, while according to another feature of the invention, the reaction is effected also without the aid of a catalyst at ordinary temperature with a considerable excess of fatty acid.

In both cases improved results are obtained when the acids are used in a concentrated condition and it has been discovered that when for example the formic acid employed is practically free from water, not only is a purer ester mixture obtained and so isoborneol-borneol esters of higher melting point therefrom, but also the yield is improved.

The invention is illustrated by the following examples the parts being by weight.

Example 1

136 parts of camphene are heated to boiling in an oil bath together with 58 parts of anhydrous formic acid; the temperature in the oil bath is about 100° C. to commence with but is finally raised to 150° C. A reaction mixture having about 98% content of isoborneol-formate is obtained.

Example 2

136 parts of camphene are stirred together with 276 parts of adhydrous formic acid at room temperature until a homogeneous solution is obtained. The solution is allowed to stand for some time at ordinary temperature. A mixture of esters of about 100% is obtained. On working up for isoborneol an exceptionally pure product containing a slight amount of borneol is obtained having a higher melting point than the product of Example 1.

I wish it to be understood that the production of the said esters is not limited to the exact proportions and operations described, for obvious modifications will occur to a person skilled in the art.

I claim as my invention:—

1. Process of manufacturing esters of the borneols, which consists in causing a fatty acid to react upon camphene without the use of a catalyst at a temperature substantially above room temperature.

2. Process of manufacturing esters of the borneols, which consists in causing an anhydrous fatty acid to react upon camphene without the use of a catalyst at a temperature substantially above room temperature.

3. Process of manufacturing esters of the borneols, which consists in causing anhydrous formic acid to react upon camphene without the use of a catalyst at about 150° C.

4. Process of manufacturing esters of the borneols, which consists in heating camphene together with anhydrous formic acid without the use of a catalyst firstly to about 100° C. and finally to about 150° C.

5. Process of manufacturing esters of the borneols, which consists in causing a considerable excess of a fatty acid to react upon camphene without the use of a catalyst.

6. Process of manufacturing esters of the borneols, which consists in causing a considerable excess of an anhydrous fatty acid to react upon camphene without the use of a catalyst.

7. Process of manufacturing esters of the borneols, which consists in causing a considerable excess of anhydrous formic acid to react upon camphene without the use of a catalyst.

8. Process of manufacturing esters of the borneols, which consists in stirring camphene together with a considerable excess of anhydrous formic acid without the use of a catalyst until a homogeneous solution is obtained and allowing the solution to stand for some time.

In testimony whereof I affix my signature.

FRITZ ULFFERS.